United States Patent [19]

Liman et al.

[11] Patent Number: 5,416,125
[45] Date of Patent: May 16, 1995

[54] PROCESS FOR THE PRODUCTION OF SEMIRIGID FOAMS CONTAINING URETHANE GROUPS WITH IMPROVED FLOW PROPERTIES

[75] Inventors: Ulrich Liman, Langenfeld, Germany; Peter Gansen, Pittsburgh, Pa.

[73] Assignee: Bayer Aktiengesellschaft, Leverkusen, Germany

[21] Appl. No.: 325,715

[22] Filed: Oct. 19, 1994

[30] Foreign Application Priority Data

Oct. 29, 1993 [DE] Germany ............... 43 37 012.8

[51] Int. Cl.$^6$ .................... C08G 18/06; C08J 9/08
[52] U.S. Cl. ..................... 521/160; 521/114; 521/174
[58] Field of Search ............ 521/160, 114, 174

[56] References Cited

U.S. PATENT DOCUMENTS 5,132,334  7/1992  Gansen et al. .............. 521/160

Primary Examiner—Morton Foelak
Attorney, Agent, or Firm—Joseph C. Gil; N. Denise Brown

[57] ABSTRACT

The present invention relates to a process for the production of semi-rigid foams containing urethane groups which exhibit very good flow properties during the production process. These semi-rigid foams are produced by reacting a reaction mixture of:
1) polyisocyanates,
2) organic compounds containing at least two isocyanate-reactive hydrogen atoms and having a molecular weight in the range from 400 to 10,000, and
3) water and/or organic blowing agents.

In particular, the polyisocyanates comprise a mixture of:
   a) 55 to 87% by weight, based on 100% by weight of the mixture, of 4,4'-diphenylmethane diisocyanate,
   b) 8 to 40% by weight, based on 100% by weight of the mixture, of 2,4'-diphenylmethane diisocyanate,
   c) 0.1 to 4% by weight, based on 100% by weight of the mixture, of 2,2'-diphenylmethane diisocyanate, and
   d) 5 to 35% by weight, based on 100% by weight of the mixture, of polyphenyl polymethylene polyisocyanates.

5 Claims, No Drawings

PROCESS FOR THE PRODUCTION OF SEMIRIGID FOAMS CONTAINING URETHANE GROUPS WITH IMPROVED FLOW PROPERTIES

BACKGROUND OF THE INVENTION

This invention relates to a process for the production of semirigid foams containing urethane groups which exhibit very good flow properties during the foaming process. Due to the good flow properties of the reaction mixtures, these reaction mixtures are even capable of filling closed molds of complicated construction including, for example, molds of the type used in automobile manufacture for the production of back-foamed instrument panels, without any unwanted defects and voids.

German Offenlegungschrift 4,001,556 describes mixtures of tolylene diisocyanate and diphenylmethane diisocyanate as the polyisocyanate component for the production of flexible foams. Unfortunately, these flexible foams are unsuitable for the production of instrument panels because they do not show satisfactory flow properties in the production of semirigid polyurethane foams. In addition, tolylene diisocyanate is often undesirable to processors for reasons of industrial hygiene.

It has now surprisingly been found that distinct improvements in the flow properties of foamable reaction mixtures can be obtained wherein the reaction mixtures comprise special mixtures of diphenylmethane diisocyanate (MDI) and polyphenylene polymethylene polyisocyanate (PMDI). These MDI/PMDI mixtures differ from hitherto known mixtures in their relatively high content of monomeric MDI isocyanates, more particularly the 2,4'-MDI content. Typical modifications of these isocyanates, for example, by urethane, carbodiimide, isocyanurate or urea groups, lead to similar positive effects.

DESCRIPTION OF THE INVENTION

The present invention relates to a process for the production of semirigid foams containing urethane groups by reacting a reaction mixture comprising:
1) polyisocyanates, with
2) organic compounds containing at least two isocyanate-reactive hydrogen atoms and having molecular weights of 400 to 10,000, and
3) water and/or organic blowing agents,
wherein said polyisocyanates comprise a mixture of
   a) 55 to 87% by weight, based on 100% by weight of the mixture, of 4,4'-diphenylmethane diisocyanate,
   b) 8 to 40% by weight, based on 100% by weight of the mixture, of 2,4'-diphenylmethane diisocyanate,
   c) 0.1 to 4% by weight, based on 100% by weight of the mixture, of 2,2'-diphenylmethane diisocyanate, and
   d) 5 to 35% by weight, based on 100% by weight of the mixture, of polyphenyl polymethylene polyisocyanates.

The reaction mixture may optionally comprise:
4) organic compounds containing at least two isocyanate-reactive hydrogen atoms and having a molecular weight of 32 to 399 as crosslinking agents, and
5) auxiliaries and additives known per se to be suitable for polyurethane chemistry.

In one preferred embodiment, the polyisocyanate mixtures comprise:
   a) 60 to 75% by weight of 4,4'-diphenylmethane diisocyanate,
   b) 10 to 25% by weight of 2,4'-diphenylmethane diisocyanate,
   c) 1 to 3% by weight of 2,2'-diphenylmethane diisocyanate, and
   d) 20 to 30% by weight of polyphenyl polymethylene polyisocyanates.

In one preferred embodiment, plastic films are back-foamed with the foam-forming reaction mixture to form film/foam composites.

Suitable starting components for the process according to the invention are described hereinafter.

Suitable mixtures of isomers of diphenylmethane diisocyanate and polyphenyl polymethylene polyisocyanates comprise: a) 55 to 87% by weight, based on 100% by weight of the mixture, of 4,4'-diphenylmethane diisocyanate, b) 8 to 40% by weight, based on 100% by weight of the mixture, of 2,4'-diphenylmethane diisocyanate, c) 0.1 to 4% by weight, based on 100% by weight of the mixture, of 2,2'-diphenylmethane diisocyanate, and d) 5 to 35% by weight, based on 100% by weight of the mixture, of polyphenyl polymethylene polyisocyanates. It is preferred that these mixtures comprise: a) 60 to 75% by weight of 4,4'-diphenylmethane diisocyanate, b) 10 to 25% by weight of 2,4'-diphenylmethane diisocyanate, c) 1 to 3% by weight of 2,2'-diphenylmethane diisocyanate, and d) 20 to 30% by weight of polyphenyl polymethylene polyisocyanates.

Modification products of these isocyanates which contain, for example, urethane, carbodiimide, isocyanurate or urea groups are also suitable for the present invention. Thus, polyether and/or polyester polyols having a functionality of 2 to 4 and a molecular weight of 150 to 8,000 are suitable for the urethane modification (i.e. prepolymer formation). Some examples of suitable polyols include polypropylene glycols having molecular weights in this range.

The process also requires organic compounds containing at least two isocyanate-reactive hydrogen atoms and having a molecular weight of generally 400 to 10,000. Suitable compounds include, for example, those compounds containing amino groups, thiol groups or carboxyl groups. Compounds such as these preferably include, for example, compounds containing hydroxyl groups, preferably polyethers, polyesters, polycarbonates, polylactones and polyamides. Among these compounds, those containing 2 to 8 hydroxyl groups are preferred, with those having molecular weights in the range of 1,000 to 8,000 being more preferred, and those having molecular weights in the range of 2,000 to 4,000 being most preferred. Suitable examples of such compounds containing at least 2, generally 2 to 8 and preferably 2 to 4 hydroxyl groups of the type known per se for the production of homogeneous and cellular polyurethanes such as those described in, for example, German Offenlegungschrift 2,832,253, pages 11 to 18, the disclosure of which is herein incorporated by reference. Mixtures of various such compounds may also be used in accordance with the present invention.

A particularly preferred embodiment is characterized by the use of polyether polyols which have been obtained by the alkoxylation of trifunctional starter molecules, more particularly trimethylol propane and/or glycerol. The alkylene oxides used in the alkoxylation reaction include, in particular, propylene oxide or ethylene oxide or mixtures of these two alkylene oxides.

These specifically disclosed alkylene oxides may also be used in succession with each other in the alkoxylation reaction. Other basically suitable polyols which may be used include those described in, for example, European Patent 380,993, the disclosure of which is herein incorporated by reference.

Suitable blowing agents include water, and other organic blowing agents such as, for example, readily volatile $C_{1-3}$ hydrocarbons or organic solvents, such as, for example, acetone or diethyl ether. These other organic blowing agents may be used as blowing agents either individually, or together with water.

The reaction mixtures for the process of the invention may also contain some optional starting components. These optional components include organic compounds containing at least 2, preferably 2 to 6 isocyanate-reactive hydrogen atoms, and having a molecular weight of 32 to 399. Some examples of such suitable compounds include diethanolamine, triethanolamine, ethylene glycol, propylene glycol, butane-1,4-diol and the isomers of diethyl tolylenediamine. These organic compounds are generally present in quantities of 1 to 20% by weight, based on the combined weight of the high molecular weight organic compounds, the blowing agents and/or water, these low molecular weight organic compounds, and the additives.

Auxiliaries and additives known per se in the field of polyurethane chemistry, such as, for example, emulsifiers and foam stabilizers, may also be present in the reaction mixtures. Preferred emulsifiers include, for example, those based on alkoxylated fatty acids and higher alcohols. Suitable foam stabilizers include, above all, polyether siloxanes, and particularly water-soluble polyether siloxanes. These compounds are generally synthesized in such a way that a copolymer of ethylene oxide and propylene oxide is attached to a polydimethyl siloxane unit. Foam stabilizers such as these are described in, for example, U.S. Pat. Nos. 2,834,748, 2,917,480 and 3,629,308, the disclosures of which are herein incorporated by reference. The catalysts known per se from polyurethane chemistry, such as tertiary amines and/or organometallic compounds, may also be used in the process. Reaction retarders, for example substances showing an acidic reaction, such as hydrochloric acid or organic acid halides, cell regulators known per se, such as paraffins or fatty alcohols or dimethyl polysiloxanes and also pigments or dyes, stabilizers against the effects of ageing, plasticizers, fungistatic and bacteriostatic agents and also fillers, such as barium sulfate, kieselguhr, carbon black or whiting, may also be used. The flameproofing agents used are generally the flameproofing agents known per se, and preferably those products which are liquids at 20° C.

Additional examples of surface-active additives and foam stabilizers, cell regulators, reaction retarders, stabilizers, flameproofing agents, plasticizers, dyes, fillers, fungistatic and bacteriostatic agents which may be optionally used in accordance with the invention and information on the use of these additives and their modes of action can be found in, for example, Kunststoff-Handbuch, Vol. VII, Edited by Vieweg and Höchtlen, Cad Hanser Verlag, München 1966, for example, on pages 103 to 113.

The process according to the invention may be carded out as follows:

According to the invention, the reaction components are reacted by the one-shot process known per se, by the prepolymer process or by the semiprepolymer process, often using machines, for example, of the type described in U.S. Pat. No. 2,764,565. In general, the reaction is carded out at an isocyanate index of 50 to 180 and preferably 70 to 120. By the term "isocyanate index" (also commonly referred to as NCO index), is defined herein as the equivalents of isocyanate, divided by the total equivalents of isocyanate-reactive hydrogen containing materials, multiplied by 100.

The process according to the invention is suitable for the production of semirigid polyurethane foams (having compressive strength 20 to 400 KPa at 40% compression) with a density of 30 to 500 kg/m$^3$ and preferably 30 to 200 kg/m$^3$, as used in known manner inter alia for the backfoaming of plastic films for the production of film/foam composites for upholstery purposes and for energy-absorbing moldings for the interior of motor vehicles, aircraft, ships and other modes of transportation (instrument panels, interior door linings, armrests, head restraints, side impact protection systems and the like).

Plastic films suitable for this particular purpose (i.e. backfoaming) are any known surface skins which have hitherto been used in the production of composite film materials by backfoaming of plastic films with polyurethane foams. Examples of such surface layers include films of polyvinyl chloride (PVC), polyurethane, polymer blends of PVC and ABS or thermoplastic polyolefins.

The process according to the invention is preferably carded out by lining the inner walls of a mold at least partly with the plastic film to be back-foamed and then filling the mold with the foamable mixture. Suitable mold materials are metals such as, for example, aluminum, or plastics such as, for example, epoxy resin. The films used for lining the molds may be formed in known manner by the known technique of thermoforming or the so-called powder-slush technique.

According to the invention, the foamable reaction mixture may be introduced into the mold in such a quantity that the foam formed just fills the mold. However, it is also possible to introduce an excess of foamable reaction mixture into the mold than what is necessary for filling the interior of the mold with foam. This particular technique is known as overcharging and is described in, for example, U.S. Pat. Nos. 3,178,490 and 3,182,104.

The process according to the invention is further illustrated by the following examples. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees celsius and all parts are parts by weight.

EXAMPLES

Production of the foams and procedure for flow length measurement

The foams are produced by hand foaming. To this end, all the constituents except for the isocyanate are combined and stirred for 30 seconds (at a speed of 1,000 r.p.m.). The isocyanate component is then added and the mixture is stirred for another 10 seconds at room temperature. In all the Examples, the NCO index is 100.

The flow properties of the reaction mixture were determined in another series of tests in which the polyol formulation, as described below, is reacted with the isocyanate component with stirring at room temperature in a glass beaker.

Using a so-called flow labyrinth, which is described in the article by R. G. Petrella and J. D. Tobias in J. of Cellular Plastics, 421-440, 1989, the flow length in cm was determined from the starting point. Quantities of 250 g (±4 g) were introduced in each case. These results are reported in Table 1 below.

Example 1 (According to the Invention)

a) polyol formulation:

92 parts by weight of a polyether having an OH value 28, and being prepared by propoxylation of trimethylol propane and subsequent ethoxylation (PO:EO ratio % by weight 83:17),
0.5 part by weight of diethanolamine,
2.0 parts by weight of triethanolamine,
0.25 part by weight of N,N-bis-(dimethylaminopropyl)-formamide,
0.25 part by weight of permethylated tetraethylene pentamine,
1.95 parts by weight of water,
0.5 part by weight of carbon black made into a paste in the above polyether, OH value 28 (see above),
2.0 parts by weight of an OH functional polyester (comprising the reaction product of adipic acid/hexane-1,6-diol, and having an OH value 160, 50% solution in butylbenzyl phthalate)

b) Isocyanate component (NCO content: 32.5%):
15% by weight of polyphenyl polymethylene polyisocyanates,
60% by weight of 4,4'-diphenylmethane diisocyanate,
23% by weight of 2,4'-diphenylmethane diisocyanate, and
2% by weight of 2,2'-diphenylmethane diisocyanate.

The foam was produced in a weight ratio of: 100 parts by weight of polyol formulation a) to 34.4 parts by weight of the isocyanate mixture from Example 1.

Example 2 (Comparison)

a) Polyol formulation: as in Example 1
b) Isocyanate component: (NCO content: 31.5%)
55% by weight of polyphenyl polymethylene polyisocyanates,
42% by weight of 4,4'-diphenylmethane diisocyanate,
2.5% by weight of 2,4'-diphenylmethane diisocyanate, and
0.05% by weight of 2,2'-diphenylmethane diisocyanate.

The foam was produced in a weight ratio of: 100 parts by weight of the same polyol formulation as in Example 1 and 44 parts by weight of the isocyanate component from Example 2.

TABLE 1

| | Comparison of the flow lengths | |
|---|---|---|
| Example | Flow length in cm | Remarks |
| 1 | 150 | Invention |
| 2 | 134 | Comparison Example* |

*The foam structure of the Comparison Example was distinctly coarser at the bends in the labyrinth than in Example 1 according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of semirigid foams containing urethane groups by reacting a reaction mixture comprising:
   1) polyisocyanates,
   2) organic compounds containing at least two isocyanate-reactive hydrogen atoms and having a molecular weight of 400 to 10,000, and
   3) water and/or organic blowing agents
   the improvement wherein said polyisocyanates comprise a mixture of:
   a) 55 to 87% by weight, based on 100% by weight of the mixture, of 4,4'-diphenylmethane diisocyanate,
   b) 8 to 40% by weight, based on 100% by weight of the mixture, of 2,4'-diphenylmethane diisocyanate,
   c) 0.1 to 4% by weight, based on 100% by weight of the mixture, of 2,2'-diphenylmethane diisocyanate, and
   d) 5 to 35% by weight, based on 100% by weight of the mixture, of polyphenyl polymethylene polyisocyanates.

2. The process of claim 1 wherein said reaction mixture additionally comprises:
   4) one or more organic compounds containing at least two isocyanate-reactive hydrogen atoms and having a molecular weight of 32 to 399.

3. The process of claim 2 wherein said reaction mixture additionally comprises:
   5) additives.

4. The process of claim 1, wherein said polyisocyanates comprise a mixture of:
   a) 60 to 75% by weight of 4,4'-diphenylmethane diisocyanate,
   b) 10 to 25% by weight of 2,4'-diphenylmethane diisocyanate,
   c) 1 to 3% by weight of 2,2'-diphenylmethane diisocyanate, and
   d) 10 to 30% by weight of polyphenyl polymethylene polyisocyanates.

5. In a process for the production of film/foam composites by backfoaming of plastic films by lining the inner walls of a mold at least partially with a plastic film, introducing a foam-forming reaction mixture comprising 1) polyisocyanates, 2) compounds containing at least two isocyanate-reactive hydrogen atoms and having molecular weights of from 400 to 10,000, and 3) water and/or organic blowing agents into the mold, allowing the reaction mixture to react, and removing the formed film/foam composite from the mold, the improvement wherein said polyisocyanates comprise a mixture of:
   a) 55 to 87% by weight, based on 100% by weight of the mixture, of 4,4'-diphenylmethane diisocyanate,
   b) 8 to 40% by weight, based on 100% by weight of the mixture, of 2,4'-diphenylmethane diisocyanate,
   c) 0.1 to 4% by weight, based on 100% by weight of the mixture, of 2,2'-diphenylmethane diisocyanate, and
   d) 5 to 35% by weight, based on 100% by weight of the mixture, of polyphenyl polymethylene polyisocyanates.

* * * * *